(12) United States Patent
Arakawa

(10) Patent No.: US 7,940,160 B2
(45) Date of Patent: May 10, 2011

(54) LOCK CONTROLLER OF WORKING MACHINE, AND WORKING MACHINE

(75) Inventor: Shuji Arakawa, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 991 days.

(21) Appl. No.: 11/793,599

(22) PCT Filed: Jan. 10, 2006

(86) PCT No.: PCT/JP2006/000122
§ 371 (c)(1),
(2), (4) Date: Jun. 21, 2007

(87) PCT Pub. No.: WO2006/075566
PCT Pub. Date: Jul. 20, 2006

(65) Prior Publication Data
US 2007/0271972 A1 Nov. 29, 2007

(30) Foreign Application Priority Data
Jan. 12, 2005 (JP) .................... 2005-004832

(51) Int. Cl.
*G05B 19/00* (2006.01)
(52) U.S. Cl. .................. 340/5.31; 340/430; 340/426.11
(58) Field of Classification Search ................ 340/5.28
See application file for complete search history.

(56) References Cited

U.S. PATENT DOCUMENTS

| 4,852,680 A | 8/1989 | Brown et al. | |
|---|---|---|---|
| 4,991,683 A * | 2/1991 | Garretto et al. | 180/287 |
| 5,414,418 A | 5/1995 | Andros, Jr. | |
| 5,547,039 A * | 8/1996 | Berger et al. | 180/287 |
| 5,563,586 A * | 10/1996 | Baum et al. | 340/3.5 |
| 5,632,190 A | 5/1997 | Sunamura et al. | |
| 5,774,065 A | 6/1998 | Mabuchi et al. | |
| 5,969,633 A | 10/1999 | Rösler | |
| 6,236,120 B1 * | 5/2001 | Loraas et al. | 307/10.4 |
| 6,930,917 B2 | 8/2005 | Novac et al. | |

(Continued)

FOREIGN PATENT DOCUMENTS
CN 1462246 12/2003
(Continued)

OTHER PUBLICATIONS
U.S. Appl. No. 11/793,615, filed Jun. 21, 2007, Arakawa.
(Continued)

*Primary Examiner* — Daniel Wu
*Assistant Examiner* — Brian Wilson
(74) *Attorney, Agent, or Firm* — Posz Law Group, PLC

(57) ABSTRACT

The convenience of use of a method for locking a working machine without locking actuation by a human being is improved. A lock control device (80) of a working machine (1) includes: a stop operation detection means (186) which detects that a predetermined stop operation has been performed by the working machine (1); a time period length measurement means (187) which measures the time period length from when it has been detected that the predetermined stop operation has been performed, to the present; and a lock setting means (188) which: if the time period length which has been measured is within a predetermined time period length, without locking the working machine, makes it possible to restart it without a password; and, if the time period length which has been measured is greater than the predetermined time period length, locks the working machine (1), and makes restarting possible upon password input.

6 Claims, 7 Drawing Sheets

U.S. PATENT DOCUMENTS

| | | | |
|---|---|---|---|
| 6,968,998 B2 * | 11/2005 | Daniel et al. | 235/382.5 |
| 7,177,738 B2 * | 2/2007 | Diaz | 701/29 |
| 7,183,666 B2 * | 2/2007 | Arakawa et al. | 307/10.2 |
| 7,388,471 B2 * | 6/2008 | Scheer et al. | 340/426.1 |
| 7,394,347 B2 * | 7/2008 | Kady | 340/5.54 |
| 7,394,352 B2 * | 7/2008 | Bell et al. | 340/426.3 |
| 2003/0125836 A1 * | 7/2003 | Chirnomas | 700/236 |
| 2003/0137398 A1 | 7/2003 | Shibata et al. | |
| 2004/0046639 A1 * | 3/2004 | Giehler et al. | 340/5.63 |
| 2004/0145241 A1 | 7/2004 | Arakawa et al. | |
| 2004/0164848 A1 | 8/2004 | Hwang et al. | |
| 2004/0210380 A1 | 10/2004 | Morita et al. | |

FOREIGN PATENT DOCUMENTS

| | | |
|---|---|---|
| EP | 0 857 629 A2 | 8/1998 |
| EP | 1 440 855 A1 | 7/2004 |
| JP | A-63-155915 | 6/1988 |
| JP | A-2000-034746 | 2/2000 |
| JP | A-2000-255382 | 9/2000 |
| JP | A-2002-264768 | 9/2002 |
| JP | A-2003-040081 | 2/2003 |
| JP | A-2003-137066 | 5/2003 |
| JP | A-2003-161199 | 6/2003 |
| JP | A-2004-74832 | 3/2004 |
| JP | A-2004-114893 | 4/2004 |
| WO | WO 02/079010 | 10/2002 |

OTHER PUBLICATIONS

Office Action dated Oct. 24, 2008 in corresponding Chinese patent application No. 200680002004.7 (and English translation).

European Search Report dated Oct. 23, 2008 in corresponding European patent application No. 06711492.6-2421 (and English translation).

European Search Report dated Oct. 21, 2008 in corresponding European patent application No. 06702053.7-2421 (and English translation).

Office Action dated Jul. 22, 2010 from U.S. Patent Office in related U.S. Appl. No. 11/793,615.

* cited by examiner

LOCK CONTROLLER OF WORKING MACHINE, AND WORKING MACHINE

FIELD

The present invention generally relates to an improvement in control for locking a working machine such as a construction machine or a haulage vehicle or the like, and for releasing its locked state.

BACKGROUND

A technique is known for ensuring that a working machine does not operate even when actuated by a human being, in other words for locking the working machine (for example refer to Published Document #1). In the state in which the working machine is locked (hereinafter simply termed the "locked state"), the locked state is released when the correct password has been inputted.

Published Document #1: Japanese Laid-Open Patent Publication 2003-40081.

SUMMARY

Problem

Generally a working machine is very expensive, and, if it should be stolen, the loss incurred is great. Furthermore, depending upon the type of the working machine, sometimes operation thereof by a person whose level of specialized knowledge is low can be dangerous.

Due to the reasons described above by way of example, it is desired to prevent a working machine from being operated freely at will. This is one objective of providing a locking function to a working machine.

One method which has been contemplated as a method for locking a working machine is a method of the working machine being locked by a human being performing a predetermined locking actuation procedure, in short, a method of manual locking (hereinafter termed a manual locking method).

However, if this method is employed, sometimes the operator may forget to apply the locking procedure to the working machine. Due to this, sometimes it is not possible to attain the objective described above.

Accordingly, a method of the working machine being locked upon the occasion of a predetermined operation such as engine stopping or the like being performed, in other words, a method for locking the working machine without locking actuation being performed by a human being (hereinafter termed an automatic locking method) has been contemplated. According to this method, the possibility of the working machine being left after the end of working without being locked is prevented before it even happens.

However, if simply this automatic locking method is employed, then, since the working machine is locked upon the occasion of the predetermined operation, accordingly the necessity arises to perform actuation for releasing the locking (for example, input of a password) each time operation is started (for example, each time the engine key switch is turned to ON). Due to this, it is considered that problems like those described below will arise.

(1) The First Problem

Sometimes working may be interrupted by performing stoppage actuation (for example turning the engine key switch to OFF) for a predetermined stoppage operation (for example stopping the engine), in order for the operator to get his errand (for example urination, smoking, inspection, or receiving support from a supervisor) for a short time period (for example several minutes to several tens of minutes). Since, when this is done, the working machine is locked by the predetermined operation being performed, accordingly, when work is to be restarted, it is necessary for the operator to perform actuation for releasing the locking (for example, input of the password). This requirement for performing actuation for locking release each time the operator concludes business for a short time period is rather troublesome. Due to this, if the working machine is adapted so that it is possible selectively to set whether or not to perform locking by the automatic locking method, then there is a fear that locking by the automatic locking method will no longer be selected.

(2) The Second Problem

At a dangerous place such as a railroad crossing or an intersection, sometimes it may happen that the working machine may be locked by the predetermined operation (for example a accidental engine stoppage) being performed. In this case, the working machine should be moved away from this dangerous place as quickly as possible. However, since the working machine has gone into its locked state due to the predetermined operation being performed, in order to actuate the working machine, the operator has to perform the actuation for releasing its locking. Due to this, the fear arises that the danger will not be avoided in time.

Due to the reasons above, the convenience of use when simply employing an automatic locking method is poor.

Accordingly, one objective of the present invention is to improve the convenience of use of a method for locking a working machine without locking actuation by a person.

Further objectives of the present invention will become clear from the following description.

Means for Solution

Although, in the description on this section, reference symbols provided within parentheses show exemplary correspondence relationships with elements described in the appended drawings, these reference symbols are only provided as examples for the purposes of explanation, and are not intended to limit the technical scope of the present invention in any way.

The device according to the present invention is a lock control device for a working machine (1), which locks starting upon a stop operation of the working machine (1) being performed and releases this starting lock upon password input via an input unit (82). This lock control device includes: a stop operation detection unit (186) which detects that a predetermined stop operation has been performed by the working machine (1); a length measurement unit (187) which measures the time period length from when it has been detected that the predetermined stop operation has been performed, to the present; and a lock setting unit (188). This lock setting unit (188): if the time period length which has been measured is within a predetermined time period length, makes the locking of the working machine (1) ineffective, and, if starting of the working machine (1) is requested, makes it possible to restart the working machine (1) without password input; and, if the time period length which has been measured is greater than the predetermined time period length, locks the starting of the working machine (1), and releases the locking and makes it possible to restart the working machine (1) upon password input.

Here, "a predetermined stop operation has been performed by the working machine (1)" may mean at least one of the following: a stop operation which has been performed due to actuation by a human being (for example, due to the engine key switch being turned to OFF); or a stop operation which has been performed due to some cause other than actuation by a human being (for example, due to an unanticipated engine stop occurring).

With a first embodiment, the predetermined time period length may be a time period length which can be set by the user via an input unit (82). In this case, it would also be acceptable to register this time period length in advance in a time information storage unit (64), which is a predetermined storage region. Furthermore, the input unit (82) may be mounted to the lock control device; or it may also be mounted to a device which is present externally to the lock control device (for example, to a portable type terminal which is owned by the user). To put this in another manner, the lock control device may be capable of receiving input of the time period length from the external device. The time period length which is inputted may be written into the time information storage unit (64).

With a second embodiment, the lock control device may further include a predetermined time period length control unit (189) which: if the present time point is a time point which belongs to a certain time period band, makes the predetermined time period length be a first time period length which can be set by the user; and, if the present time point is a time point which does not belong to the certain time period band, makes the predetermined time period length be a second time period length which is different from the first time period length.

With a third embodiment, in the second embodiment, among the first time period length and the second time period length, at least the second time period length may be made to be a time period length set from a manager terminal (206) which is used by a manager who is present at a location remote from the working machine (1).

With a fourth embodiment, in the third embodiment, the lock control device may further include a time information storage unit (64) which stores the certain time period band, and a time information write unit (190) which updates the certain time period band stored in the time information storage unit (64). And, while the time information write unit (190) permits setting, from the manager terminal (206), of the start time point of the certain time period band to be earlier and/or setting of its end time point to be later, the time information write unit (190) forbids setting, from the input unit (82), of the start time point of the certain time period band to be earlier and/or setting of its end time point to be later.

With a fifth embodiment, in the second embodiment, it may be characterized in that the second time period length is shorter than the first time period length.

It would be acceptable to mount the lock control device (80) to the working machine (1); or it would also be acceptable to mount it to some device other than the working machine (1) which can communicate with the working machine (1) (for example, to a server which is capable of communication with the working machine (1) via a communication network).

The various units described above may alternatively be expressed as means. Each of these units or means may also be implemented by hardware (for example, circuitry), by a computer program, or by a combination thereof (for example, by one or a plurality of CPUs which read and execute a computer program). Each of these computer programs may be read from a storage resource (for example a memory) which is provided to a computer device. This program may be installed to this storage resource via a recording medium such as a CD-ROM or a DVD (Digital Versatile Disk) or the like; or it may also downloaded via a communication network such as the internet or a LAN or the like.

Benefits

According to the present invention, it is possible to improve the convenience of use of a method for locking a working machine without locking actuation by a human being.

DRAWINGS

SYMBOLS

1: working machine, 12: electronic controller, 64: time information storage unit, 66: power supply, 71: key switch, 73: engine starter, 80: lock control device, 81: display unit, 82: input unit, 83: lock flag, 84: password storage unit, 86: lock control unit, 186: stop operation detection unit, 187: time period length measurement unit, 188: lock setting unit, 189: Ts control unit, 190: time information write unit, 191: correct password write unit, 205: communication unit, 206: manager terminal.

EMBODIMENT

In the following, an embodiment of the present invention will be explained based upon the drawings.

Figure 1:
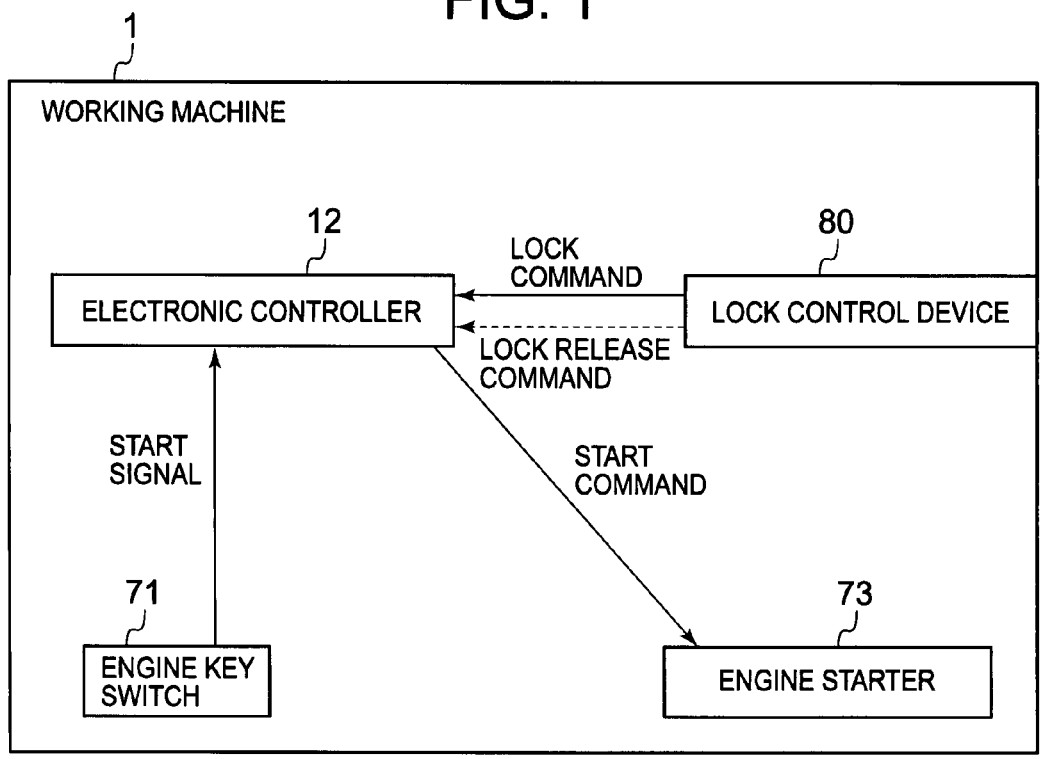
FIG. 1 is a figure showing an example of a structure of a working machine according to an embodiment of the present invention.

FIG. 1 shows an example of a structure of a working machine according to this embodiment.

This working machine 1 comprises an electronic controller 12 which monitors the states of the various sections of the working machine 1 and moreover controls the operation of these various sections electronically, and a lock control device 80 which performs locking of the working machine (1) and release of the locking thereof, according to commands which it receives from the electronic controller 12.

The electronic controller is connected to various sensors which are fitted to various structural elements of the working machine 1 (for example, its engine, battery, fuel tank, radiator, and the like). These sensors include, for example, a service meter (a sensor which measures and integrates the working time period), an engine rotational speed sensor, a battery voltage sensor, a fuel amount sensor, a cooling water temperature sensor, and the like. The electronic controller generates information (hereinafter termed the "working information") which specifies the working time period, the engine rotational speed, the battery voltage, the fuel amount, the cooling water temperature and the like detected by these sensors (in other words, the various states and operations of the working machine 1), and sends this working information to a predetermined server via a communication network not shown in the figures (for example, a satellite communication network). Furthermore, in response to the detection signals from the above described sensors (or in response to control commands supplied from the predetermined server), the electronic controller 12 controls the states and/or the operation of the various structural elements of the working machine 1 electronically. For example this electronic controller 12 receives a lock command as one of these control commands from the lock control device 80 (or from the predetermined server). And when the electronic controller 12 receives this lock command, it locks the working machine so as to ensure that the working machine 1 does not start even if it is actuated by the operator (or limits the operations of which the working machine 1 is capable).

Although several methods may be considered for locking the working machine 1, one of these methods may be realized by the method shown by way of example in FIG. 1, in which the start signal of the engine key switch 71 is cut off. In other words, with this method, the electronic controller 12 distinguishes the signal from the lock control device 80, and, if the state in which the lock command is being inputted holds, does not accept a start signal from the engine key switch 71, so that thereby starting of the engine cannot be performed. Furthermore, if the state in which the lock release command is being inputted, engine starting is performed by the electronic controller 12 outputting a start signal from the engine key switch 71 as a start command to the engine starter 73.

The above is an explanation of a method for cutting the start signal of the engine key switch 71. However it should be understood that, as described above, the locking method is not limited to this method. For example, as other locking methods, there are a method of opening a battery relay between the battery and some electrical component, a method of interrupting a pilot signal of a control valve which controls some hydraulically operated device, a method of interrupting an input and output command signal of a fuel injection valve for the engine, and the like. With any of these methods, either the working machine is completely stopped, or the movement of which it is capable is limited.

Next, the lock control device 80 will be explained in detail.

Figure 2:
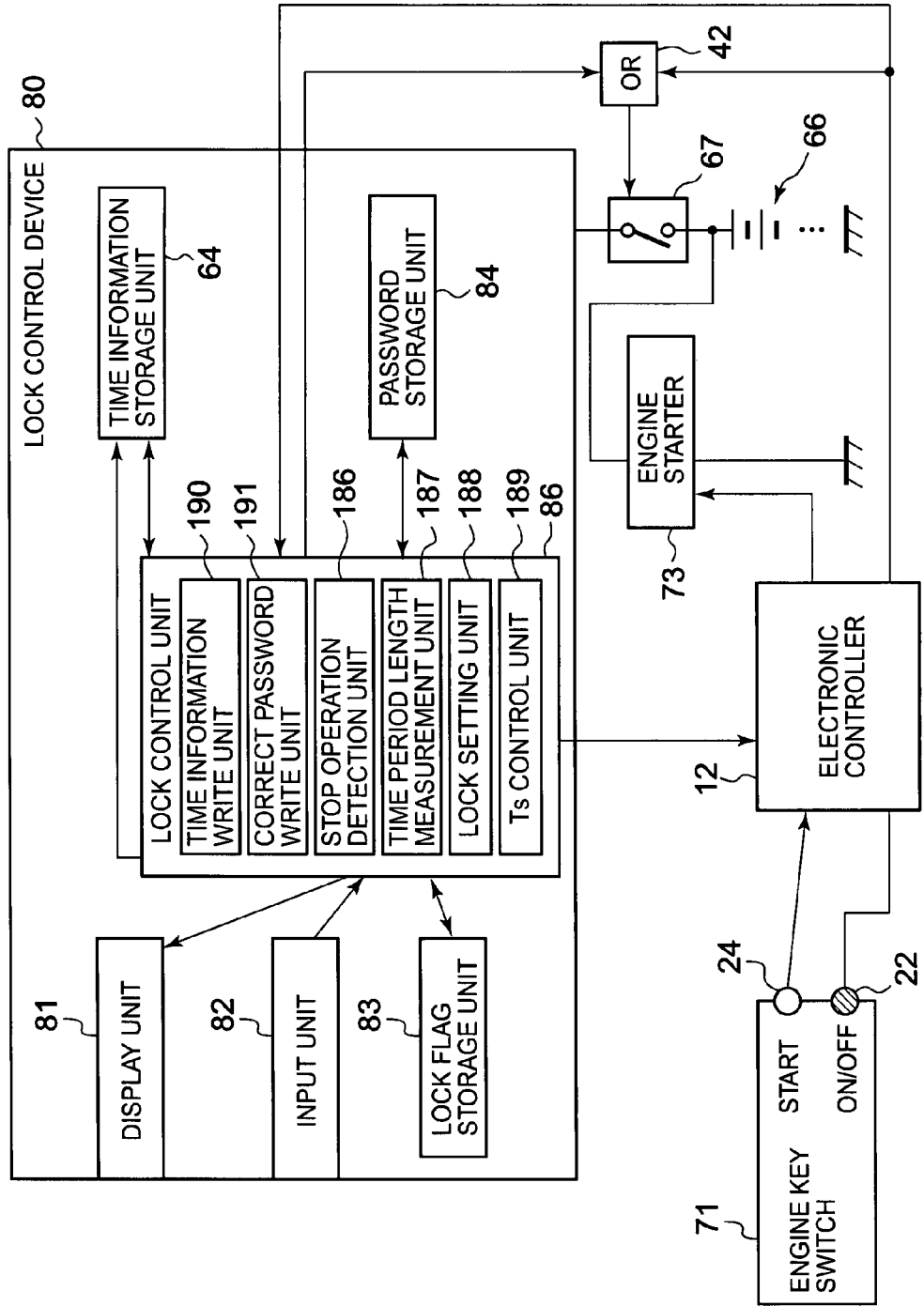
FIG. 2 shows an example of a functional structure of a lock control device 80.

FIG. 2 shows an example of the functional structure of the lock control device 80.

This lock control device 80 may be considered, for example, as being a type of control panel which comprises a display unit 81 such as a liquid crystal panel, and an input unit 82 for a human being to input a secret code (a password) for lock setting and release. It should be understood that, since it is sufficient for the input unit 82 to serve for inputting a password, it will be acceptable for it to be implemented as a tenkey pad provided upon the control panel, or as a touch panel, or as a reception device provided to the input unit 82 which can perform input by communication from the exterior—for example, as a portable telephone, an ID card, a wireless tag, or the like. The lock control device 80 comprises a lock flag storage unit 83, a password storage unit 84, a time information storage unit 64, and a lock control unit 86. It would be acceptable for these various storage units 83, 84, and 64 to be provided upon the same storage device (for example a memory or a hard disk); or it would also be acceptable for them to be provided upon separate storage devices.

The lock flag storage unit 83 stores a lock flag which may be raised and lowered. The lock flag being raised means that the working machine 1 is in the locked state, while the lock flag being lowered means that the working machine 1 is in the non-locked state.

The password storage unit 84 stores the correct password for allowing the locking to be released. It would also be acceptable for this correct password to be one which is registered via the input unit 82. The input unit 82 is not limited to being mounted upon the lock control device; it could also be mounted upon a device which is external to the lock control device (hereinafter termed an external device). Here, the device in this embodiment referred to as "external device" may be a fixed type computer system such as a personal computer or a server machine or the like, or may be a portable type computer system (such as, for example, a portable telephone device, a PHS (Personal Handy phone System), a PDA (Personal Digital Assistant) or notebook type personal computer); and the time information storage unit 64 stores time information related to a working time period band (for example a working time period band for the working machine 1 itself, or a working time period band for the place of work), or a time period threshold value which is compared with a time period measured after a predetermined stoppage operation is detected, or the like. As the time information related to the working time period band, any type of information which specifies the working time period band would be acceptable. For example, the time information related to the working time period band may be settings for the working start time point and the working end time point, or may be a setting for the working start time point or for the working end time point and a setting for the working time period.

The lock control unit 86 is a device which controls the operation of the lock control device 80, and is, for example, a processor which operates by reading in at least one computer program from a predetermined storage region (not shown in the drawings). This lock control unit 86 may comprise, for example, a time information write unit 190, a correct password write unit 191, a stop operation detection unit 186, a time period length measurement unit 187, a lock setting unit 188, and a Ts control unit 189. Each of this plurality of elements (functions) may be implemented by hardware, by a computer program, or by a combination thereof.

The time information write unit 190 receives time information related to the working time period band from the user via the input unit 82, and writes this information into the time information storage unit 64. Furthermore, the time information write unit 190 receives from the user, via the input unit 82, a time period length threshold value (hereinafter this is sometimes expressed as "Ts") which is compared with the length of the time period (hereinafter the measured time period length) which has been measured from when a predetermined stop operation has been detected to the present time, and stores this time period length threshold value in the time information storage unit 64.

The correct password write unit 191 receives from the user, via the input unit 82, a correct password (the password which is compared with a password inputted for releasing the locking), and writes this correct password in the password storage unit 84.

The stop operation detection unit 186 is able to detect that a predetermined stop operation for the working machine 1 has been performed. Here by "predetermined stop operation" may be considered as being at least one of a stop operation which is performed due to actuation by a human being (for example an engine key switch 71 being turned to OFF), and a stop operation which is performed due to some cause other than actuation by a human being (for example that an unanticipated engine stoppage has occurred). In concrete terms, for example, the stop operation detection unit 186 may detect that an unanticipated engine stoppage has occurred according to a signal inputted, for example, from a sensor for ascertaining the rotational speed of the engine. Furthermore, for example, the stop operation detection unit 186 may detect that the engine key switch has been turned to OFF according to, for example, an input signal from ON/OFF contact points 22 of the engine key switch 71.

If it has been detected that the predetermined stop operation has been performed, the time period length measurement unit 187 is able to measure the time period length from when this is detected to the present.

The lock setting unit 188 is able to raise the lock flag of the lock flag storage unit 83 (for example to write "1" therein) when the working machine 1 is locked (for example, when a lock command is outputted to the electronic controller 12), and is able to lower the lock flag (for example to write "0" therein) when the locking of the working machine 1 is released (for example, when a lock release command is outputted to the electronic controller 12). Furthermore, the lock setting unit 188 is able to refer to the lock flag storage unit 83, and to decide that the working machine 1 is locked if the lock flag is raised, while deciding that the working machine 1 is not locked if the lock flag is lowered. Yet further, if it has been detected that the predetermined stoppage operation has been performed, the lock setting unit 188 is able to lock the working machine 1 if a predetermined time period has elapsed from when this was detected (in concrete terms, if the time period length measured by the time period length measurement unit 187 has exceeded the time period length threshold value (Ts) which is stored in the time information storage unit 64). Moreover, in the state in which the working machine 1 is locked, when a predetermined actuation has been performed (for example, when the engine key switch has been turned to ON), the lock setting unit 186 is able to display a screen for inputting a password upon the display unit 81 (it would also be acceptable to provide this upon an external device), and, if a password has been inputted via the input unit 82, is able to decide whether or not this password which has been inputted agrees with the correct password which is stored in the password storage unit 84, and to release the locking of the working machine 1 if they do agree with one another.

The Ts control unit 189 is able to control what sort of value is employed as the time period length threshold value (Ts).

As the states of the engine key switch 71, for example, there may be three types of state: an OFF state which means that the engine of the working machine 1 is stopped; an ON state which means that the power supply to a predetermined device of the working machine 1 is turned on; and a start state which means that the engine of the working machine 1 is started. To put this in another manner, for example, the engine key switch 71 may have an ON/OFF contact point 22 which indicates that the OFF state and the ON state are current, and a start contact point 24 which indicates that the start state is current. The ON/OFF contact point 22 and the start contact point 24 may be, for example, connected to the electronic controller 12.

Electrical power is supplied from the power supply 66 of the working machine 1 (for example a battery) to its various sections such as an engine starter 73 and the lock control device 80 and so on. A power supply switch 67 is provided to the lock control device 80, and the ON/OFF of this power supply switch 67 is controlled by signals which are inputted via an OR circuit 42 from the ON/OFF contact point 22 of the engine key switch 71 and from the lock control unit 86. Or, to put it in another manner, the OR circuit 42 puts the power supply switch 67 of the lock control device 80 to its ON state if a signal is inputted from at least one of the ON/OFF contact point 22 of the engine key switch 71 and the lock control unit 86, while it puts the power supply switch 67 of the lock control device 80 to its OFF state, if signals have ceased to be inputted from either of them.

Figure 3:
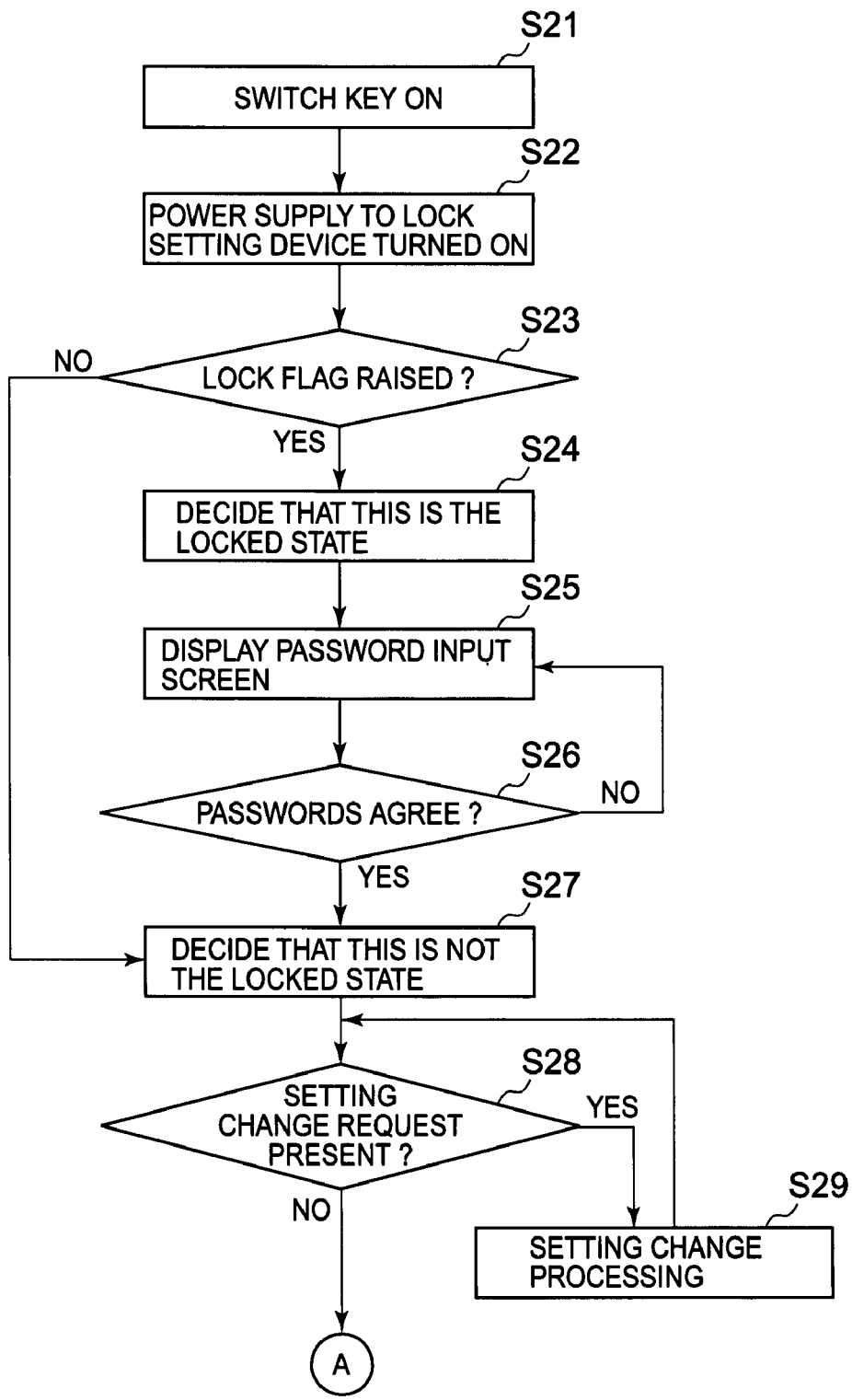
FIG. 3 shows a portion of a summary of a processing flow performed by this working machine 1.
Figure 4:
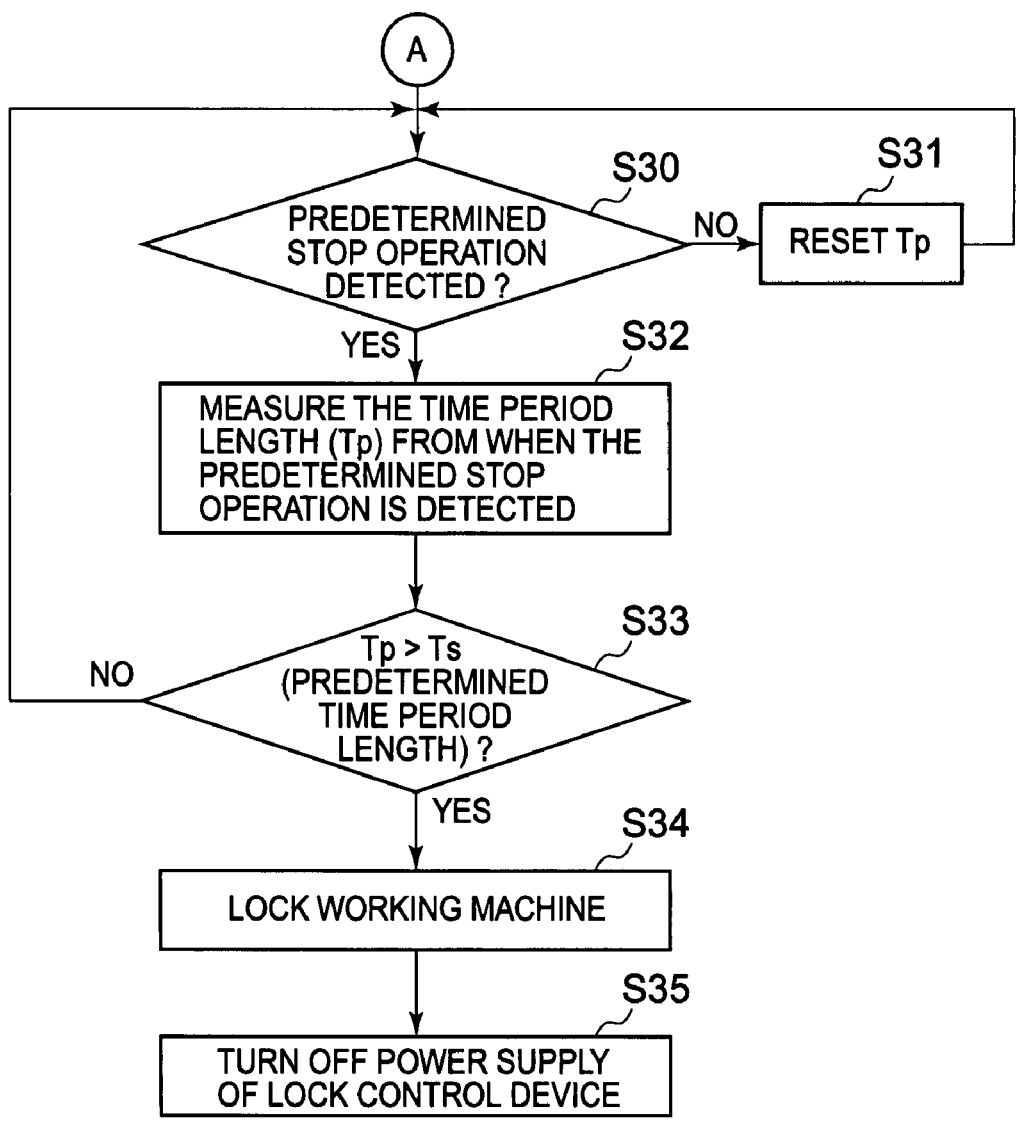
FIG. 4 shows the remainder of this summary of the processing flow performed by this working machine 1.

FIGS. 3 and 4 show a summary of the processing flow performed by this working machine 1.

As shown in FIG. 3, when the engine key which is inserted into the engine key switch 71 is turned from the OFF position to the ON position (a step S21), a signal which means that it has gone to ON (hereinafter termed an ON signal) is inputted from the ON/OFF contact point 22 via the electronic controller 12 to the lock control unit 86, and thereby the lock control unit 86 is able to detect that the engine key switch 87 has gone into the ON state. Furthermore, this ON signal is also inputted from the ON/OFF contact point 22 via the electronic controller 12 to the OR circuit 42, and thereby the power supply switch 67 of the lock control device 80 is turned ON (a step S22).

The lock setting unit 188 of the lock control unit 86 accesses the lock flag storage unit 83, and decides whether the lock flag is raised or is lowered (a step S23).

If it is decided in the step S23 that the lock flag is raised (Y in S23), then the lock setting unit 188 decides that the working machine 1 is locked (a step S24), and displays a password input screen for receiving input of the password upon the display unit 81 (a step S25).

When a password is inputted via this password input screen, the lock setting unit 188 compares together (a step S26) the password which has been inputted and the correct password stored in the password storage unit 84. And, if the result of this comparison is that these passwords do not agree with one another (N in S26), as error processing, the lock setting unit 188 may request input of a password again (for example, it may perform the step S25 a second time).

If the result obtained by the comparison in the step S26 is that the passwords agree with one another (Y in S26), or if it is decided in the step S23 that the lock flag is lowered (N in S23), then it is decided that the working machine 1 is not locked (a step S27). It should be understood that, in this step S27 after a YES in the step S26, the lock setting unit 188 lowers the lock flag. Furthermore, the lock setting unit 188 outputs a lock release command to the electronic controller 12. In this case, even though a start signal is outputted from the engine key switch 71, the electronic controller 12 is able to ensure that a start command is supplied to the engine starter 73, by ensuring that it does not receive this start signal.

After the step S27, if for example a request for a change of any setting has been received (for example, if the time information write unit 190 has received a change request for the previously described time period length threshold value) (Y in a step S28), then the lock control unit 86 responds to this request, and performs (a step S29) setting change processing (for example, processing for the time information write unit 190 to overwrite the time period length threshold value which is already registered in the time information storage unit 64 with a time period length threshold value which has been newly inputted from the user).

Furthermore, although this feature is not specifically shown in the figures, after the step S27, when for example the engine key which is inserted into the engine key switch 71 is rotated from the ON position to the start position, a start signal is inputted from the start contact point 24 to the electronic controller 12, and a start command is inputted from the electronic controller 12 to the engine starter 73. Due to this, the engine starts.

If, after the step S27, the engine key is rotated to the OFF position or an unanticipated engine stoppage occurs or the like, as shown in FIG. 4, the stop operation detection unit 186 detects the predetermined stop operation. When this predetermined stop operation has been detected (Y in the step S30), the following processing is performed without the lock setting unit 188 directly locking the working machine 1 and turning OFF the power supply of the lock control device 80 (for example, by continuing to send a signal to the OR circuit 42, the power supply switch 67 is prevented from undesirably turning OFF by the OR circuit 42).

That is, the time period length measurement unit 187 measures the length (Tp) of the time period from when the predetermined stop operation is detected to the present (a step S32). And, each time the measured value (Tp) of the time period length is updated, the lock setting unit 188 compares together the measured value (Tp) of the time period length and the threshold value (Ts) of the time period length which is registered in the time information storage unit 64, and makes a decision as to whether or not Tp is greater than Ts (a step S33).

If the result of the decision in the step S33 is that it is decided that Tp is not greater than Ts (N in the step S33), then Y in the step S30 and S32 are performed again. And if, during this period, the lock setting unit 188 has detected some operation other than the predetermined stop operation (for example, that the engine key has been rotated to the ON position) (N in the step S30), then it resets the measured value (Tp) of the time period length (in other words, returns it to zero) (the step S31).

If the result of the step S33 is that an operation other than the predetermined stop operation is not detected, then, if it has been decided that Tp is greater than Ts (Y in the step S33), the lock setting unit 188 locks the working machine 1 (a step S34). In concrete terms, the lock setting unit 188 outputs a lock command to the electronic controller 12. As a result, it is possible for the electronic controller 12 to behave as though no start signal is received from the engine key switch 71.

Thereafter, the lock setting unit 188 turns OFF the power supply of the lock control device 80 (a step S35). In concrete terms, for example, the lock setting unit 188 may stop sending a signal to the OR circuit 42. Due to this, the OR circuit 42 turns the power supply switch 67 of the lock control device 80 OFF, since also no signal is received from the lock control unit 86.

Now, the Ts control unit 189 of the lock control unit 86 is able to change the time period length threshold value.

Figure 5:
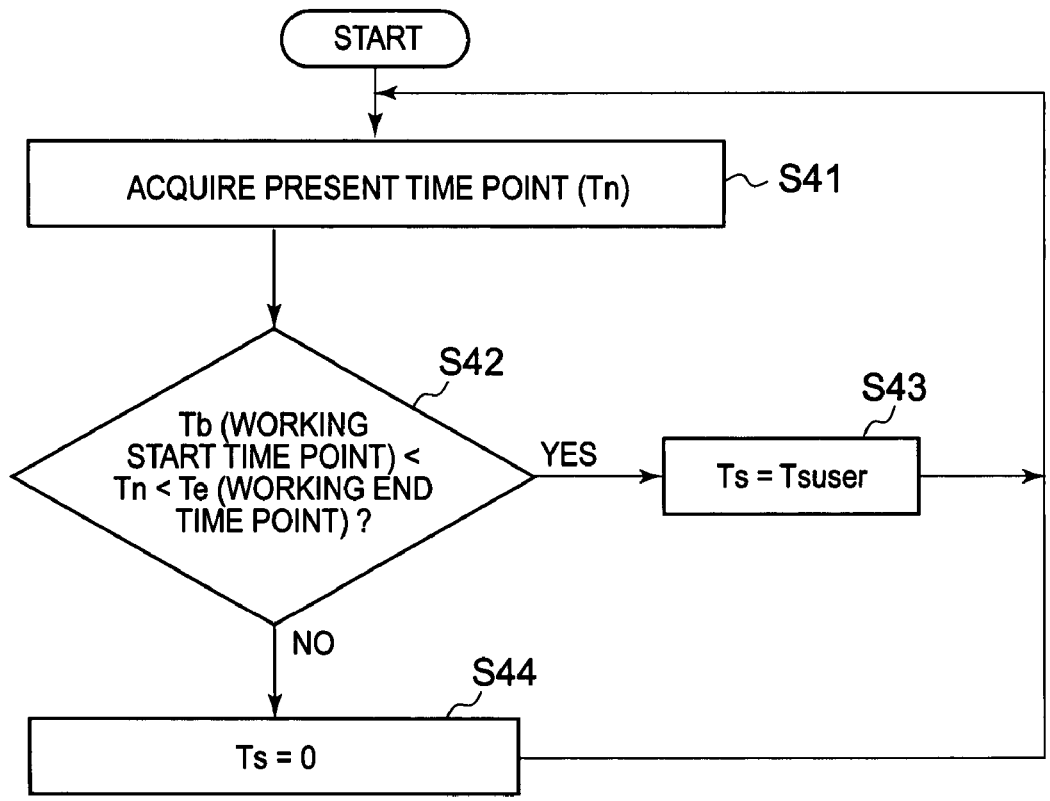
FIG. 5 shows an example of a processing flow for changing a time period length threshold value.

FIG. 5 shows an example of the flow of processing for this changing of the time period length threshold value.

The Ts control unit 189 acquires the present time point (Tn) (a step S41). This present time point may be acquired, for example, from a timer not shown in the figures which is mounted to the electronic controller 12.

The Ts control unit 189 acquires a working time period band (for example, time period band information which is specified by a working start time point (Tb) and a working end time point (Te)) from the time information storage unit 64, and makes a decision as to whether or not the present time point (Tn) which has been acquired is within this working time period band which has been acquired (a step S42).

If the result of the step S42 is that it is decided that the present time point (Tn) is within the working time period band (Y in the step S42), then the Ts control unit 189 sets, for example in a predetermined storage region, the use of a time period length threshold value (Tsuser) which has been set by the user (that is, a value which has been inputted from the user via the input unit 82) as the time period length threshold value (Ts) which is the object of comparison in the step S33 (a step S43).

On the other hand, if the result of the step S42 is that it is decided that the present time point (Tn) is not within the working time period band (N in the step S42), then the Ts control unit 189 sets, for example in a predetermined storage region, not to use, as the time period length threshold value (Ts) which is the object of comparison, the time period length threshold value (Tsuser) which has been set by the user, but rather to use a value which is smaller than the predetermined time period length threshold value (for example zero) (a step S44).

According to the embodiment described above, in a method for locking a working machine without locking actuation by a human being, the working machine 1 is not locked directly after a predetermined stop action is detected, but instead the working machine 1 is first locked when a predetermined time period has elapsed without any operation other than the predetermined stop operation (for example engine starting) being performed. Since, due to this, even if the operator stops the engine for a short time period in order to conclude business, provided that this business is concluded and the engine is started within the predetermined time period, it is possible to start the operation of the working machine without performing any lock release actuation (for example input of a password), accordingly the convenience of use is good.

Furthermore, according to the embodiment described above, although the time period length desired by the user is employed as the above described Ts if the present time point is within the working time period band, if the present time point does not belong to the working time period band, then a shorter time period length that the time period length desired by the user is forcibly employed. If a stop operation takes place at a time point which belongs to the working time period band, then it is considered that thereafter the working machine 1 may well be operated again; but, if a stop operation takes place at a time point which does not belong to the working time period band, then it is considered that working has ended, and that the possibility is low of the working machine 1 being operated again that day. Since the above described Ts, which is the object of comparison, is changed in a manner to match this sort of situation, accordingly the convenience of use is even further improved.

Moreover, with the present invention, other embodiments such as described in the following may be envisaged.

Figure 6:
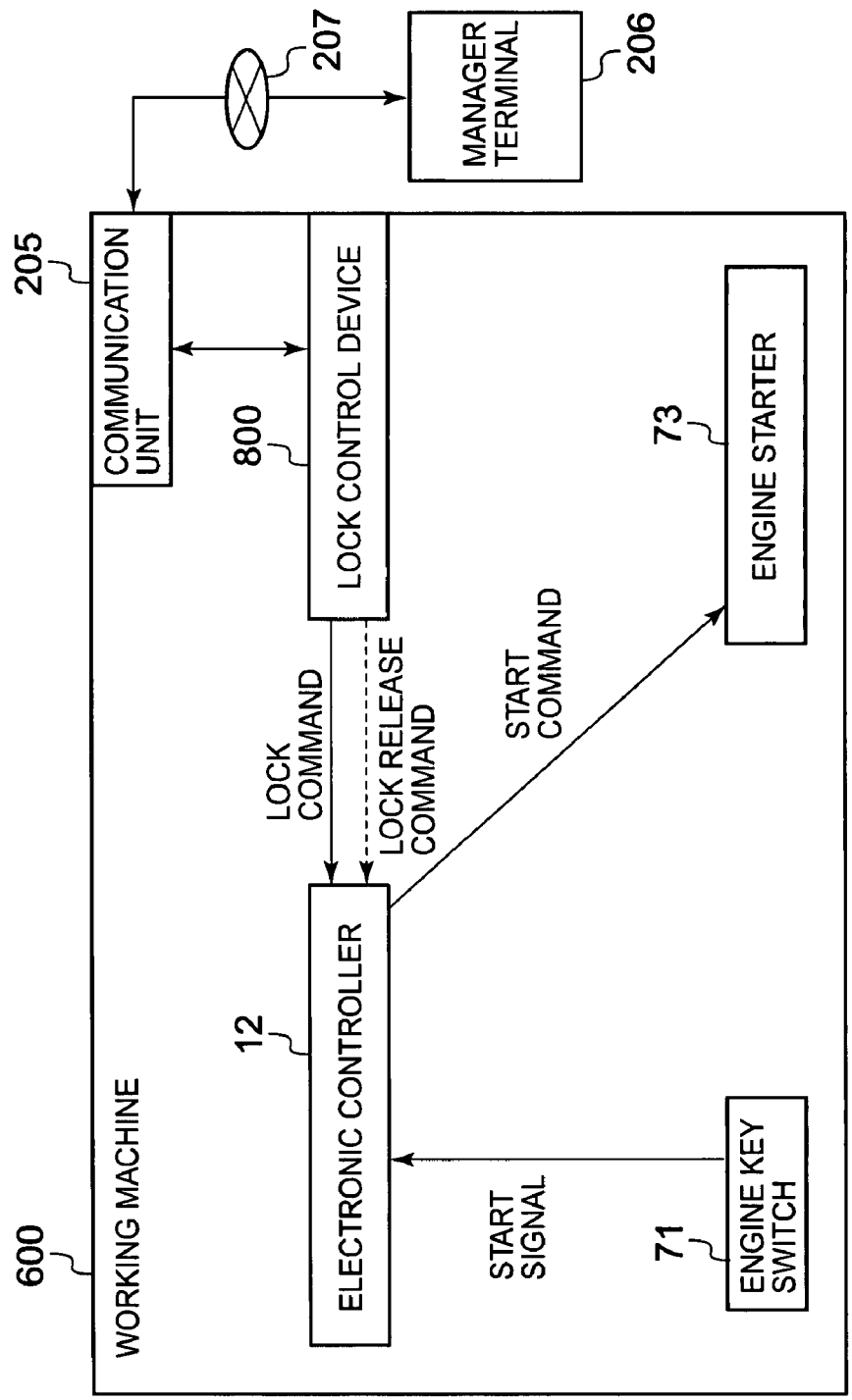
FIG. 6 shows an example of a structure of a working machine according to another embodiment of the present invention.

FIG. 6 shows an example of a structure of a working machine according to another embodiment of the present invention.

The working machine 600 is equipped with a communication unit 205 which is capable of communication with a lock control device 800 according to another embodiment of the present invention. Although this communication unit 205 may be made as a device which communicates by wireless, it would also be acceptable for it to be a device which communicates by cable.

Via the communication unit 205 (or via a further communication network 207), the lock control device 800 can perform communication with a communication terminal 206 which is used by a manager (for example the external device described above, hereinafter termed the "manager terminal"). In concrete terms, for example, the communication unit 205 and the input unit 206 are capable of communication by cable or by wireless. Information which has been received by the communication unit 205 from the manager terminal 206 can, for example, be inputted to the lock control unit 86 via the input unit 82. Accordingly, apart from a user interface such as a key group or a touch panel or the like which can be actuated by the user (sometimes also termed the "operator"), the input unit 82 may comprise, for example, a device for inputting information from the communication unit 205 (for example a wireless communication device).

In this other embodiment, the working time period band may be set from the manager terminal 206. Since, due to this, it is possible for the manager who is managing the working machine 600 to set the working time period band in correspondence to the conditions of working and the progress of the job, accordingly the convenience of use is enhanced.

In the following, an example of update control for the working time period band and Ts will be explained.

Figure 7:
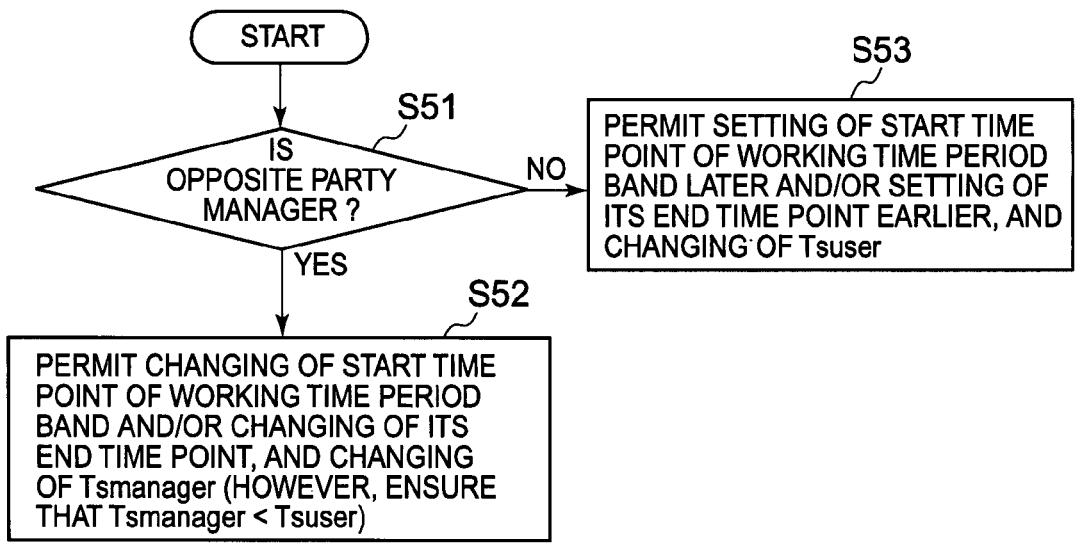
FIG. 7 shows an example of a processing flow for changing time information, in this other embodiment of the present invention.

FIG. 7 shows an example of the flow of processing for changing the time information, in this other embodiment of the present invention.

A time information write unit 190 of the lock control unit 800 decides whether or not the opposite party to communication with itself is a manager (a step S51). This decision as to whether or not the opposite party is a manager may be performed, for example, by distinguishing whether the user ID which has been inputted is an ID of a manager, or is the ID of some other person (for example the ID of a user of the working machine 600).

If in a step S51 it is determined that the opposite party is indeed a manager (Y in the step S51), then this time information write unit 190 both permits changing of the start time point and/or the end time point of the working time period band which are stored in the time information storage unit 64, and also changing of Tsmanager (the time period length threshold value, whose setting may be changed by the manager) (a step S52).

In this state of the step S52, for example, the time information write unit 190 may overwrite the start time point which has been inputted into the time information storage unit 64, whether a start time point which is earlier than the start time point of the working time period band which is stored in the time information storage unit 64 is inputted, or a start time point which is later is inputted. Furthermore, for example, the time information write unit 190 may overwrite the end time point which has been inputted into the time information storage unit 64, whether an end time point which is earlier than the end time point of the working time period band which is stored in the time information storage unit 64 is inputted, or an end time point which is later is inputted. Due to this, the manager is able to set the working time period band from remotely, according to the state of working or the progress of the job. It should be understood that, here, "input a start time point" means the input of information by which a start time point is determined; in concrete terms, for example, it would be acceptable to input the start time point itself, and it would also be acceptable to input settings for a reference time point (for example an end time point) and for the working time period length. In the same manner, here, "input an end time point" means the input of information by which an end time point is determined; in concrete terms, for example, it would be acceptable to input the end time point itself, and it would also be acceptable to input settings for a reference time point (for example a start time point) and for the working time period length.

Furthermore, for example, the time information write unit 190 may be adapted, when Tsmanager has been inputted, to distinguish whether or not this value of Tsmanager is shorter than a value Tsuser which is stored in the time information storage unit 64, and, if indeed Tsmanager is shorter than Tsuser, it may write this value of Tsmanager which has been inputted into the time information storage unit 64, while, if Tsmanager is longer than Tsuser, it may not write this value of Tsmanager which has been inputted into the time information storage unit 64 (for example, it may request the manager to perform input again). By doing this, in a time period band which is outside the working time period band, it is possible to arrange to apply locking to the working machine 1 after the predetermined stop operation has been detected, in a time period which is shorter than the period Tsuser which has been set by the user.

If, in the step S51, the time information write unit 190 has determined that the opposite party to communication is not a manager (for example if it is a user on the spot) (N in the step S51), then setting the start time point of the working time period band which is stored in the time information storage unit 64 later, and/or setting its end time point earlier, and changing Tsmanager (the time period length threshold value, whose setting may be changed by the manager), are permitted (a step S53).

To put this in another manner, in the state of this step S53, desirably, the time information write unit 190 prohibits both setting of the start time point of the working time period band which is stored in the time information storage unit 64 earlier, and/or setting of its end time point later. In other words, although a human being other than a manager is permitted to shorten the working time period band, or, to express it in another way, although he is permitted to shorten the Tsuser condition relating to the threshold value of time period from when the predetermined stop operation is detected to when the locking is applied, he is forbidden to lengthen the working time period band. Since, due to this, the working time period band is prevented from dishonestly being made longer, accordingly it is possible to prevent Tsuser from being used in a time period band outside the working time period band.

Although the present invention has been explained above in terms of several embodiments thereof, these have only been given as examples for explanation of the present invention; the scope of the present invention is not to be considered as being limited only to those embodiments. The present invention may be implemented in various manners other than the ones described in those embodiments, provided that its gist is not departed from.

The invention claimed is:

1. A lock control device for a working machine, which locks starting upon a performance of a stop operation of the working machine, and releases the starting lock upon password input via an input unit, comprising:
   a stop operation detection unit which detects that a predetermined stop operation has been performed by the working machine;
   a time period length measurement unit which measures a time period length from when it has been detected that said predetermined stop operation has been performed, to the present;
   a lock setting unit which: if said time period length which has been measured is within a predetermined time period length, makes said locking of said working machine ineffective, and, if the starting of said working machine is requested, makes it possible to restart said working machine without password input; and, if said time period length which has been measured is greater than said predetermined time period length, locks the starting of said working machine, and releases said locking to make it possible to restart said working machine only upon the password input;
   a time point acquisition unit for acquiring a present time point; and a time period length control unit which: if the present time point is a time point which belongs to a certain time period band, makes said predetermined time period length be a first time period length; and, if the present time point is a time point which does not belong to said certain time period band, makes said predetermined time period length be a second time period length which is different from said first time period length.

2. The lock control device according to claim 1, wherein said predetermined time period length is a time period length which can be set by a user via the input unit.

3. The lock control device according to claim 1, wherein, among said first time period length and said second time period length, at least said second time period length is a time period length set from a manager terminal which is used by a manager who is present at a location remote from said working machine.

4. The lock control device according to claim 3, further comprising:

a time information storage unit which stores said certain time period band; and a time information write unit which updates said certain time period band stored in said time information storage unit; and wherein, while said time information write unit permits setting, from said manager terminal, of a start time point of said certain time period band to be earlier and/or setting of its end time point to be later, said time information write unit forbids setting, from said input unit, of the start time point of said certain time period band to be earlier and/or setting of its end time point to be later.

5. The lock control device according to claim 1, characterized in that said second time period length is shorter than said first time period length.

6. A working machine, comprising the lock control device as described in claim 1.

* * * * *